US010029517B2

(12) United States Patent
Manabe et al.

(10) Patent No.: US 10,029,517 B2
(45) Date of Patent: Jul. 24, 2018

(54) HEAVY-DUTY PNEUMATIC TIRE

(71) Applicant: The Yokohama Rubber Co., LTD., Minato-ku, Tokyo (JP)

(72) Inventors: Mitsuru Manabe, Hiratsuka (JP); Shoei Kakuta, Hiratsuka (JP); Hideki Hamanaka, Hiratsuka (JP); Yukihito Yamaguchi, Hiratsuka (JP); Risa Tauchi, Hiratsuka (JP); Toshiyuki Sato, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/523,326

(22) PCT Filed: Oct. 19, 2015

(86) PCT No.: PCT/JP2015/079409
§ 371 (c)(1),
(2) Date: Apr. 28, 2017

(87) PCT Pub. No.: WO2016/067945
PCT Pub. Date: May 6, 2016

(65) Prior Publication Data
US 2017/0240000 A1    Aug. 24, 2017

(30) Foreign Application Priority Data

Oct. 31, 2014 (JP) .................................. 2014-222857
May 13, 2015 (WO) .................. PCT/JP2015/063719

(51) Int. Cl.
*B60C 11/11*   (2006.01)
*B60C 9/20*    (2006.01)
(Continued)

(52) U.S. Cl.
CPC ................ *B60C 11/11* (2013.01); *B60C 9/20* (2013.01); *B60C 11/0304* (2013.01);
(Continued)

(58) Field of Classification Search
CPC ................ B60C 11/0311; B60C 11/11; Y10T 152/10801
See application file for complete search history.

(56) References Cited

U.S. PATENT DOCUMENTS 5,082,042 A * 1/1992 Kobayashi ................ B60C 9/20
152/535
D457,128 S * 5/2002 Robert .......................... D12/579
(Continued)

FOREIGN PATENT DOCUMENTS

JP   H09-136514   5/1997
JP   11-034615   * 2/1999
(Continued)

OTHER PUBLICATIONS

English machine translation of JP11-034615, no date.*
(Continued)

*Primary Examiner* — Robert C Dye
(74) *Attorney, Agent, or Firm* — Thorpe North & Western

(57) ABSTRACT

A heavy-duty pneumatic tire includes a tread pattern including center lug grooves, shoulder lug grooves, a pair of circumferential primary grooves formed in wave-like shapes by alternately connecting ends of the center lug grooves and ends of the shoulder lug grooves and having a smaller width than the width of the shoulder lug grooves, center blocks defined by the center lug groove and the circumferential primary grooves, and a circumferential secondary groove extending in the tire circumferential direction so as to divide regions of the center blocks. The belt portion includes two or greater pairs of belts. The ratio of the width W8 of a belt having a smaller width in each of the belt pairs to the width W7 of a belt having a greater width is 0.75 or greater and 0.90 or less.

20 Claims, 7 Drawing Sheets

(51) Int. Cl.
*B60C 11/03* (2006.01)
*B60C 11/13* (2006.01)

(52) U.S. Cl.
CPC ........... *B60C 11/0311* (2013.01); *B60C 11/13* (2013.01); *B60C 2011/0344* (2013.01); *B60C 2011/0346* (2013.01); *B60C 2011/0348* (2013.01); *B60C 2011/0353* (2013.01); *B60C 2200/065* (2013.01); *Y10T 152/10801* (2015.01)

(56) References Cited

U.S. PATENT DOCUMENTS

| | | | |
|---|---|---|---|
| 7,987,882 B2 * | 8/2011 | Kobayashi | B60C 9/2006 152/526 |
| 2007/0199633 A1 | 8/2007 | Hayashi | |
| 2008/0078488 A1 * | 4/2008 | Yoda | B60C 11/0311 152/209.26 |

FOREIGN PATENT DOCUMENTS

| | | | |
|---|---|---|---|
| JP | 2002-067624 | * | 3/2002 |
| JP | 2004-075056 | | 3/2004 |
| JP | 2004-098914 | * | 4/2004 |
| JP | 2006-151083 | | 6/2006 |
| JP | 2007-191093 | | 8/2007 |
| JP | 2008-279976 | * | 11/2008 |
| WO | WO 2006/001202 | | 1/2006 |
| WO | WO 2006/057169 | | 6/2006 |

OTHER PUBLICATIONS

English machine translation of JP2002-067624, no date.*
English machine translation of JP2008-279976, no date.*
English machine translation of JP2004-098914. (Year: 2004).*
International Search Report for International Application No. PCT/JP2015/079409 dated Dec. 15, 2015, 4 pages, Japan.

* cited by examiner

HEAVY-DUTY PNEUMATIC TIRE

TECHNICAL FIELD

The present technology relates to a heavy-duty pneumatic tire having a tread pattern.

BACKGROUND ART

Recent pneumatic tires are required to have various kinds of improved performance, and their tread patterns are contrived to improve the performance. Heavy-duty tires are provided with tread patterns that improves traction performance.

For example, a heavy-duty pneumatic tire is known that improves in both traction performance in traveling on a bad road and wet performance in traveling at high speed (see Japanese Unexamined Patent Application Publication No. H09-136514A). The heavy-duty pneumatic tire includes, in a tread, at least one circumferential groove extending in the circumferential direction and a large number of lateral grooves connecting with the circumferential groove and disposed on both sides of the circumferential groove while being separated from each other in the circumferential direction. In the pneumatic tire:

(1) the circumferential groove extends in the circumferential direction in a tread central region that corresponds to 50% of the tread width;

(2) the depth of the circumferential groove is 5% of the tread width or greater; and (3) the depth of at least lateral grooves disposed in both side sections of the tread among the lateral grooves is 109% of the depth of the circumferential groove or greater.

According to Japanese Unexamined Patent Application Publication No. H09-136514A, this configuration enhances both traction performance in traveling on a bad road and wet performance in traveling at high speed.

The above-described heavy-duty pneumatic tire can improve in traction performance in the terminal stage of wear. In such a heavy-duty pneumatic tire, the widths of blocks in a tread pattern may be increased in the tire width direction to further improve traction performance in some cases. In this case, the increased widths of the blocks in the tread central region readily increase ground contact pressure locally in the vicinities of edges of the blocks. If ends of belts in the tire width direction are disposed in substantially the same positions as the edges of the blocks in the tire width direction, the local increase in ground contact pressure applies great force to both ends of the belts in the tire radial direction and thus increases strain between belt layers. As a result, separation of belt edges readily occurs.

Especially large tires that are fitted to dump trucks traveling off-road, for example, on mines and have a size of, for example, 49 inches or greater are preferred to improve in both traction performance and belt durability by preventing separation of belt edges in view of effective use of the tires.

SUMMARY

The present technology provides a heavy-duty pneumatic tire having a tread pattern that improves in both traction performance and belt durability. The present disclosure includes various embodiments described below.

First Embodiment

A heavy-duty pneumatic tire includes a tread pattern, the tread pattern including: a plurality of center lug grooves separated from each other in a tire circumferential direction, the center lug grooves extending in half-tread regions on a first side and a second side of a tire equator line in a tire width direction so as to cross the tire equator line, and the center lug grooves including both ends; shoulder lug grooves positioned, in the tire circumferential direction, between adjacent center lug grooves in the tire circumferential direction among the center lug grooves, the shoulder lug grooves extending outward in the tire width direction in the half-tread regions, and the shoulder lug grooves having ends on an outside in the tire width direction opening at ground contact ends on both sides in the tire width direction and ends on an inside in the tire width direction being positioned outward in the tire width direction with respect to ends of the center lug grooves; a pair of circumferential primary grooves formed in wave-like shapes in the respective half-tread regions over an entire periphery of the tire by alternately connecting the ends of the center lug grooves and the ends of the shoulder lug grooves on the inside in the tire width direction, the circumferential primary grooves having a smaller width than a width of the shoulder lug grooves; a plurality of center blocks defined by the center lug grooves and the pair of circumferential primary grooves and aligned in a row in the tire circumferential direction; and a circumferential secondary groove extending along the tire equator line in the tire circumferential direction so as to divide regions of the center blocks. The belt portion includes at least a first belt disposed on an innermost side in a tire radial direction, a second belt having a different width from the first belt, a third belt, and a fourth belt having a different width from the third belt in order from the first belt toward an outside in the tire radial direction, the belt portion having a laminated structure of belt layers composed of at least two belt pairs, the two belt pairs being a pair of the first belt and the second belt and a pair of the third belt and the fourth belt. The belt pairs of the belt layers each have a ratio W8/W7 of 0.75 or greater and 0.90 or less of a width W8 of a belt having a smaller width in the belt layer to a width W7 of a belt having a greater width in the belt layer. Fourth and subsequent belts from an innermost belt in the tire radial direction toward the outside in the tire radial direction in the laminated structure of the belt portion each have a width equal to or greater than a maximum width WB of the center blocks in the tire width direction.

Second Embodiment

In the heavy-duty pneumatic tire according to embodiment 1, the circumferential primary grooves each include a raised bottom portion formed by partially making a groove depth smaller.

Third Embodiment

In the heavy-duty pneumatic tire according to embodiment 2, a depth D2 of the raised bottom portion and a tread width T of a tread portion in the tire width direction satisfy a relationship of D2/T<0.05.

Fourth Embodiment

In the heavy-duty pneumatic tire according to any one of embodiments 1 to 3, the circumferential secondary groove includes at least two groove turning portions changing an extending direction of the groove in a region between adjacent center lug grooves in the tire circumferential direction.

Fifth Embodiment

In the heavy-duty pneumatic tire according to any one of embodiments 1 to 4, orientations of reinforcing cords of belt layers having greater widths in the belt pairs of the belt layers are inclined toward a same side in the tire width direction with respect to the tire circumferential direction.

Sixth Embodiment

In the heavy-duty pneumatic tire according to any one of embodiments 1 to 5, pairs of adjacent belts in the belt portion each form a cross layer by inclining the reinforcing cords of the belts toward opposite sides in the tire width direction with respect to the tire circumferential direction.

Seventh Embodiment

In the heavy-duty pneumatic tire according to any one of embodiments 1 to 6, a belt layer positioned closer to the outside in the tire radial direction has a greater width among the belt layers having greater widths in the belt pairs of the belt layers.

Eighth Embodiment

In the heavy-duty pneumatic tire according to any one of embodiments 1 to 7, the belt portion includes a first belt pair positioned innermost in the tire radial direction, a second belt pair laminated outside the first belt pair in the tire radial direction, and a third belt pair laminated outside the second belt pair in the tire radial direction. A ratio WB/W3 of the maximum width WB of the center blocks in the tire width direction to a width W3 of a belt layer having a smaller width in the third belt pair is 0.5 or greater and 0.8 or less. The width W3 is greater than a width W2 of a belt layer having a smaller width in the second belt pair.

Ninth Embodiment

In the heavy-duty pneumatic tire according to any one of embodiments 1 to 8, the belt portion includes a first belt pair positioned innermost in the tire radial direction, a second belt pair laminated outside the first belt pair in the tire radial direction, and a third belt pair laminated outside the second belt pair in the tire radial direction. A width W1 of a belt layer having a smaller width in the first belt pair is smaller than the maximum width WB of the center blocks in the tire width direction.

Tenth Embodiment

In the heavy-duty pneumatic tire according to any one of embodiments 1 to 9, the center blocks are provided with corners in correspondence with the circumferential primary grooves, the corners having obtuse angles.

Eleventh Embodiment

In the heavy-duty pneumatic tire according to any one of embodiments 1 to 10, widths of the circumferential primary grooves and the center lug grooves are 7 mm or greater and 20 mm or less.

Twelfth Embodiment

In the heavy-duty pneumatic tire according to any one of embodiments 1 to 11, the heavy-duty pneumatic tire is fitted to a construction or industrial vehicle.

Thirteenth Embodiment

In the heavy-duty pneumatic tire according to any one of embodiments 1 to 12, the center lug grooves each include a first groove turning portion bent or curved so as to protrude toward a third side in the tire circumferential direction on the first side and a second groove turning portion bent or curved so as to protrude toward a fourth side opposite to the third side in the tire circumferential direction on the second side. The center lug groove connects with the circumferential primary grooves at a first connection end on the first side and at a second connection end on the second side, the first connection end and the second connection end connecting with tips of the circumferential primary grooves on the inside in the tire width direction, and the second connection end of the center lug groove being positioned on the third side in the tire circumferential direction with respect to the first connection end. Concerning a central position of the center lug groove in a groove width direction, an inclination angle of a first straight line connecting the first connection end with a protruding end, protruding toward the third side in the tire circumferential direction, of the first groove turning portion with respect to the tire width direction and an inclination angle of a second straight line connecting the second connection end with a protruding end, protruding toward the fourth side in the tire circumferential direction, of the second groove turning portion with respect to the tire width direction are greater than an inclination angle of a third straight line connecting the first connection end with the second connection end of the center lug groove with respect to the tire width direction.

Fourteenth Embodiment

In the heavy-duty pneumatic tire according to embodiment 13, concerning the central position of the center lug groove in the groove width direction, a section of the center lug groove between the protruding end, protruding toward the third side in the tire circumferential direction, of the first groove turning portion and the first connection end is on the first straight line or on the third side with respect to the first straight line, and a section of the center lug groove between the protruding end, protruding toward the fourth side in the tire circumferential direction, of the second groove turning portion and the second connection end is on the second straight line or on the fourth side with respect to the second straight line.

Fifteenth Embodiment

In the heavy-duty pneumatic tire according to embodiment 13 or 14, the circumferential secondary groove is shallower than the circumferential primary grooves. The circumferential secondary groove is formed over the entire periphery of the tire along the tire equator line. The circumferential secondary groove crosses the center lug grooves so as to penetrate the center lug grooves in regions between and inclusive of the first groove turning portions and the second groove turning portions in the tire width direction.

Sixteenth Embodiment

In the heavy-duty pneumatic tire according to embodiment 15, the circumferential secondary groove includes fifth groove turning portions and sixth groove turning portions on an periphery of the tire, the fifth groove turning portions being curved or bent so as to change directions thereof clockwise and the sixth groove turning portions being curved or bent so as to change directions thereof counterclockwise upon viewing the tread pattern from the outside toward the inside in the tire radial direction in traveling toward the third side in the tire circumferential direction. Sections of the circumferential secondary grooves between adjacent center lug grooves among the center lug grooves each being provided with one of the fifth groove turning portions and one of the sixth groove turning portions.

Seventeenth Embodiment

In the heavy-duty pneumatic tire according to embodiment 16, the circumferential secondary groove includes pairs of two successive fifth groove turning portions and pairs of two successive sixth groove turning portions in the tire circumferential direction. The center lug grooves cross between each of the pairs of two successive fifth groove turning portions and between each of the pairs of two successive sixth groove turning portions.

Eighteenth Embodiment

In the heavy-duty pneumatic tire according to embodiment 16 or 17, the circumferential secondary groove includes, on the periphery of the tire, a plurality of sets of one of the fifth groove turning portions, another of the fifth groove turning portions, one of the sixth groove turning portions, and another of the sixth groove turning portions arranged successively in the tire circumferential direction. A section between the one fifth groove turning portion and the other fifth groove turning portion and a section between the one sixth groove turning portion and the other sixth groove turning portion, of the circumferential secondary groove are straight grooves extending parallel to the tire equator line.

The above-described heavy-duty pneumatic tire can improve in both traction performance and belt durability.

DETAILED DESCRIPTION

A heavy-duty pneumatic tire according to the present technology will now be described in detail with reference to the attached drawings.

In this specification, "tire width direction" refers to a direction of the central axis of rotation of the pneumatic tire, and "tire circumferential direction" refers to a rotating direction of a tread surface when the tire rotates about the central axis of rotation of the tire. "Tire radial direction" refers to a radial direction from the central axis of rotation of the tire. "Outside in the tire radial direction" refers to a side that is far from the central axis of rotation of the tire, and "inside in the tire radial direction" refers to a side that is near to the central axis of rotation of the tire. "Outside in the tire width direction" refers to a side that is far from a tire equator line in the tire width direction, and "inside in the tire width direction" refers to a side that is near to the tire equator line in the tire width direction.

Heavy-duty tires in this specification include tires described in Section C of JATMA YEAR BOOK 2014 (standards of The Japan Automobile Tyre Manufacturers Association, Inc.) and tires for Classification 1 (dump trucks, scrapers), tires for Classification 2 (graders), tires for Classification 3 (shovel loaders and the like), tires for Classification 4 (tire rollers), and tires for mobile cranes (truck cranes, wheel cranes) described in Section D, or vehicular tires described in SECTION 4 or SECTION 6 of TRA 2013 YEAR BOOK.

Figure 1:
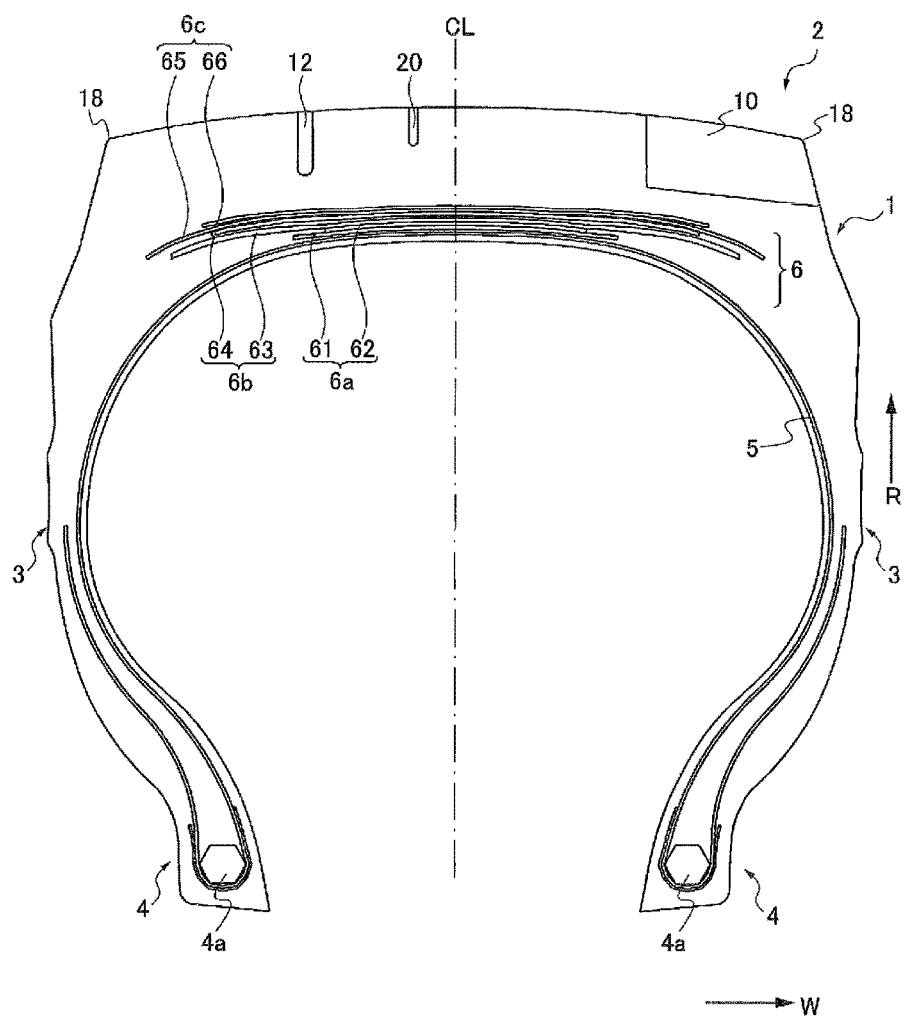
FIG. 1 is a cross-sectional view of an example pneumatic tire according to an embodiment.
Figure 2:
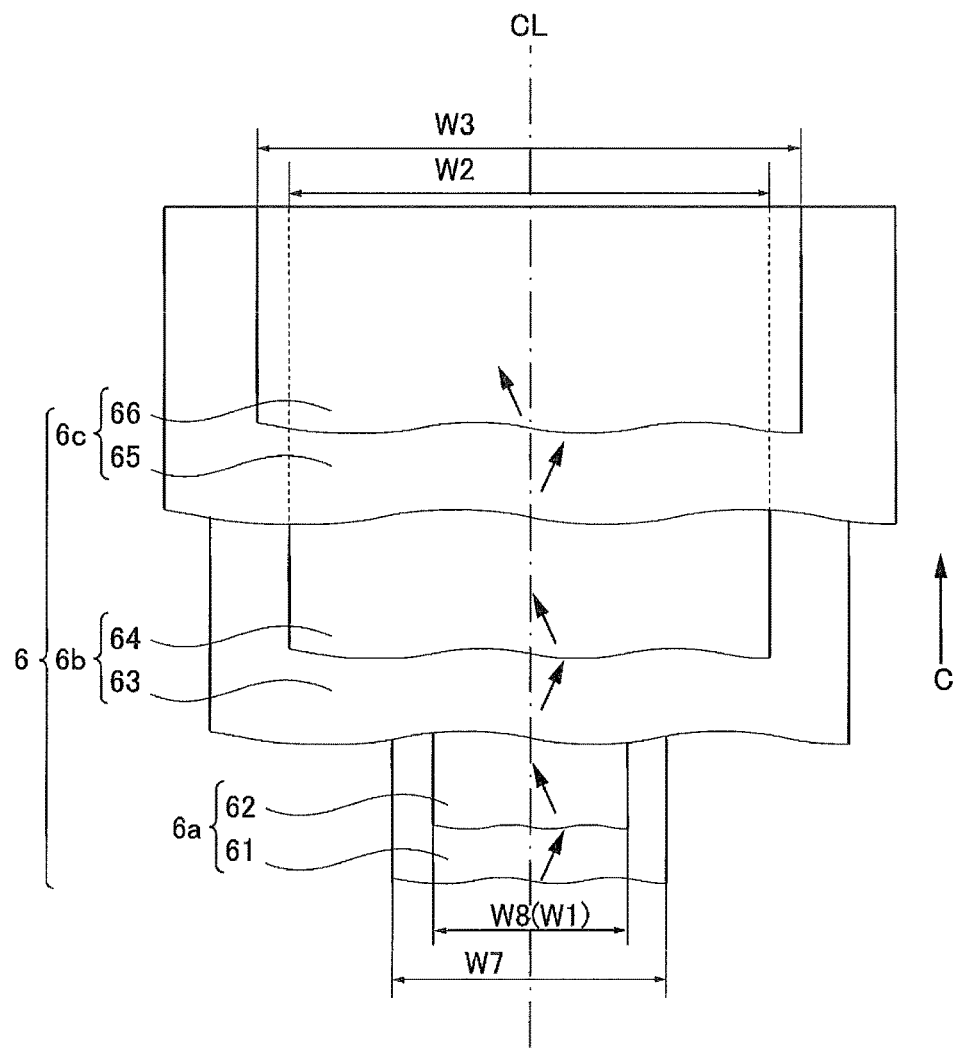
FIG. 2 illustrates widths of belts of a belt portion and orientations of reinforcing cords according to the embodiment.

FIG. 1 is a cross-sectional view of a pneumatic tire (hereinafter referred to as "tire") according to the present embodiment when the tire is cut in a plane passing through the rotational axis of the tire. The tire radial direction is indicated by R and the tire width direction by W in FIG. 1. FIG. 2 illustrates widths of belts of a belt portion and orientations of reinforcing cords according to the present embodiment.

The tire 1 illustrated in FIG. 1 includes a tread portion 2, a sidewall portion 3, and a bead portion 4. The bead portion 4 includes a pair of bead cores 4a on both sides in the tire width direction. A carcass layer 5 extends between the pair of bead cores 4a. Both ends of the carcass layer 5 are folded back around the bead cores 4a from the inside to the outside of the tire. The carcass layer 5 may be composed of a single carcass ply or a plurality of carcass plies.

The belt portion 6 is disposed outside the carcass layer 5 in the tire radial direction in the tread portion 2. The belt portion 6 has a laminated structure in which six belts are laminated in a direction outward from the inside in the tire radial direction. A first cross belt layer 6a, a second cross belt layer 6b, and a third cross belt layer 6c are provided in this order outward from the inside in the tire radial direction. The first cross belt layer 6a, the second cross belt layer 6b, and the third cross belt layer 6c are each composed of a pair of belts. As illustrated in FIG. 2, the first cross belt layer 6a, the second cross belt layer 6b, and the third cross belt layer 6c respectively include a first belt 61 and a second belt 62, a third belt 63 and a fourth belt 64, and a fifth belt 65 and a sixth belt 66 outward from the inside in the tire radial direction. In the pair of belts of each of the first cross belt layer 6a, the second cross belt layer 6b, and the third cross belt layer 6c, reinforcing cords are inclined toward mutually different sides in the tire width direction with respect to the tire circumferential direction. In this way, the belt portion 6 includes two or greater pairs of belts, one pair consisting of the first belt 61 and the second belt 62 and another pair consisting of the third belt 63 and the fourth belt 64. That is, the belt portion 6 has a laminated structure of a plurality of (two or greater) pairs of cross belt layers. The pairs are each made by two adjacent belts in the tire radial direction, in order from the first belt 61 disposed on the innermost side in the tire radial direction toward the outside in the tire radial direction, the two adjacent belts having mutually different widths.

The belt pair composing each of the cross belt layers consists of a belt having a greater width W7 and a belt having a smaller width W8. The ratio W8/W7 is 0.75 or greater and 0.90 or less. For example, the example first cross belt layer 6a illustrated in FIG. 2 includes the first belt 61 having a width W7 and the second belt 62 having a width W8. The second cross belt layer 6b includes the third belt 63 having a width W7 and the fourth belt 64 having a width W8, which is not illustrated in the drawing. Similarly, the third cross belt layer 6c includes the fifth belt 65 having a width W7 and the sixth belt 66 having a width W8.

In each of the first cross belt layer 6a, the second cross belt layer 6b, and the third cross belt layer 6c according to the present embodiment, the belt positioned inside in the tire radial direction has a width greater than the width of the belt positioned outside in the tire radial direction. In other words, the first belt 61 has a width greater than the width of the second belt 62, the third belt 63 has a width greater than the width of the fourth belt 64, and the fifth belt 65 has a width greater than the width of the sixth belt 66.

However, in the first cross belt layer 6a, the second cross belt layer 6b, and the third cross belt layer 6c according to the present embodiment, a belt positioned inside in the tire radial direction may not necessarily have a width greater than the width of a belt positioned outside in the tire radial direction. A belt in the belt pairs composing the cross belt layers may be wider or narrower than another belt in the pairs as long as the ratio W8/W7 of each of the belt pairs composing the cross belt layers is 0.75 or greater and 0.90 or less.

A belt positioned closer to the outside in the tire radial direction has a wider width among the belts having greater widths in the pairs of cross belt layers. The belt widths become greater in the order of the first belt 61 having a greater width in the first cross belt layer 6a, the third belt 63 having a greater width in the second cross belt layer 6b, and the fifth belt 65 having a greater width in the third cross belt layer 6c. The belt portion 6 according to the present embodiment includes the belts having the above-described widths; however, the belt widths may not necessarily become greater in the order of the first belt 61, the third belt 63, and the fifth belt 65.

Concerning inclination angles (absolute values) of the reinforcing cords of the belts in the first cross belt layer 6a with respect to the tire circumferential direction, the reinforcing cord having the smallest angle is preferably inclined at an angle of 8 to 11 degrees or 9 to 11 degrees with respect to the tire circumferential direction from the viewpoint of effective yielding of the so-called hoop effect, in which the belts prevent the tire from deforming to expand in the tire radial direction. The reinforcing cord having the smallest angle between the reinforcing cords of the belts in the second cross belt layer 6b is preferably inclined at an angle of 16 to 19 degrees or 6 to 8 degrees with respect to the tire circumferential direction from the viewpoint of effective yielding of the hoop effect. The reinforcing cord having the smallest angle between the reinforcing cords of the belts in the third cross belt layer 6c is preferably inclined at an angle of 26 to 29 degrees or 17 to 19 degrees with respect to the tire circumferential direction. The smallest inclination angle of the reinforcing cords of the belts in the second cross belt layer 6b is preferably smaller than the smallest inclination angle of the reinforcing cords of the belts in the third cross belt layer 6c. Specifically, concerning the inclination angles of the reinforcing cords of the belts in the belt portion 6, the first belt 61 is preferably inclined at an angle of 8 to 11 degrees, for example. The second belt 62 is preferably inclined at an angle of 8 to 11 degrees. The third belt 63 is preferably inclined at an angle of 25 to 35 degrees. The fourth belt 64 is preferably inclined at an angle of 16 to 19 degrees. The fifth belt 65 is preferably inclined at an angle of 29 to 35 degrees. The sixth belt 66 is preferably inclined at an angle of 26 to 29 degrees.

Tread Pattern

Figure 3:
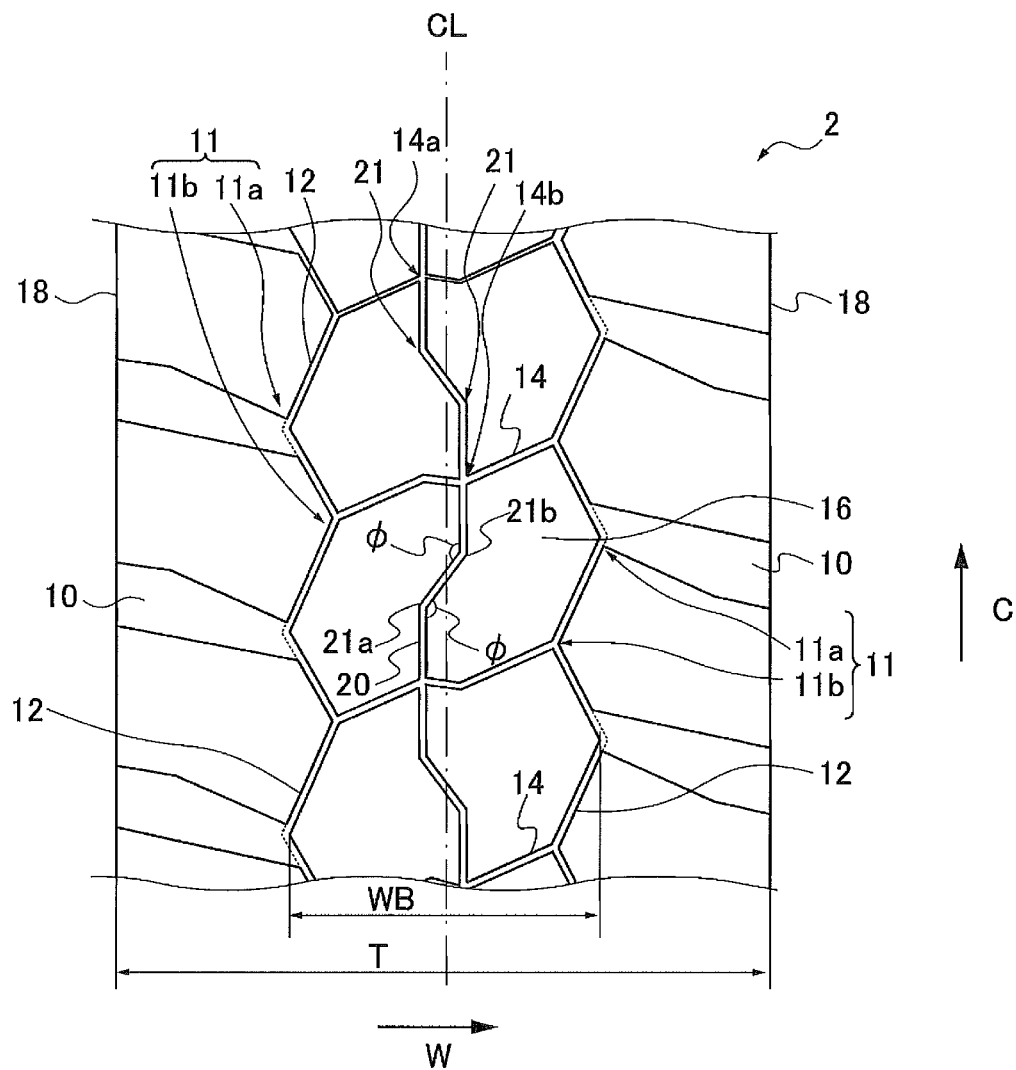
FIG. 3 is a planar development diagram of a tread pattern provided in a tread portion of the tire according to the embodiment.

FIG. 3 is a planar development diagram of a tread pattern provided in the tread portion 2 of the tire 1. The tire circumferential direction is indicated by C and the tire width direction by W in FIG. 3.

The tread portion 2 mainly includes, as the tread pattern, a shoulder lug groove 10, a pair of circumferential primary grooves 12, a center lug groove 14, a center block 16, and a circumferential secondary groove 20.

The shoulder lug grooves 10 are provided in half-tread regions on a first side (the left side on paper in FIG. 3) and a second side (the right side on paper in FIG. 3) of the tire equator line CL in the tire width direction. The shoulder lug grooves 10 are separated from each other in the tire circumferential direction. In the half-tread regions on both sides of the tire equator line CL in the tire width direction, the shoulder lug grooves 10 extend outward in the tire width direction and have their ends on the outside in the tire width direction open at tread ends (ground contact ends) 18 on both sides in the tire width direction. As illustrated in FIG. 1, the tread ends 18 are connections between the outer shapes of the tread portion 2 and the sidewall portion 3. If the connections are round, the tread ends refer to intersecting points of an extending line along the outer shape of the tread portion 2 and an extending line along the outer shape of the side portion 3.

Among the shoulder lug grooves 10 disposed on both sides in the tire width direction, one shoulder lug groove 10 in one of the half-tread regions is positioned, in the tire circumferential direction, between two adjacent shoulder lug grooves in the other of the half-tread regions.

In each of the half-tread regions, the shoulder lug grooves 10 have their ends on the inside in the tire width direction positioned outward in the tire width direction with respect to ends of the center lug grooves 14 described later, and the shoulder lug grooves 10 are provided so as to be separated from each other in the tire circumferential direction. Each of the shoulder lug grooves 10 is disposed, in the tire circumferential direction, in a shoulder region between adjacent center lug grooves 14 in the tire circumferential direction among the center lug grooves 14. This configuration allows the circumferential primary grooves 12 described later to form wave-like shapes by alternately connecting the ends of the center lug grooves 14 and the ends of the shoulder lug grooves 10 on the inside in the tire width direction.

The pair of circumferential primary grooves 12 is disposed in the half-tread regions on the first side and the second side of the tire equator line CL in the tire width direction. The circumferential primary grooves 12 are formed in wave-like shapes in the respective half-tread regions over the entire periphery of the tire by alternately connecting the ends of the center lug grooves 14 described later and the ends of the shoulder lug grooves 10 on the inside in the tire width direction. The width of the pair of circumferential primary grooves 12 is less than the width of the shoulder lug grooves 10. "Wave-like shape" of a groove indicates such a shape in which the groove meanders in the tire width direction. Primary-groove turning portions that form the wave-like shapes of the grooves and are turned so as to protrude outward or inward in the tire width direction may have a corner shape or a curved shape. The curved shape includes a shape formed by rounding a corner of a rubber block adjoining a groove corner with a predetermined radius of curvature, that is, a curved shape of a groove formed by chamfering a corner of a rubber block. Sections other than the primary-groove turning portions may be straight or curved. If the primary-groove turning portions and the sections other than the primary-groove turning portions are curved, both curved shapes may have the same radius of curvature. One of two adjacent primary-groove turning portions in the tire circumferential direction may have a bent shape formed by connecting a straight shape with a curved shape, and the other may have a curved shape.

Specifically, the circumferential primary grooves 12 include a plurality of primary-groove turning portions 11 on the periphery of the tire. The primary-groove turning portions 11 are turned so as to protrude outward or inward in the tire width direction. The circumferential primary grooves 12 extend in the tire circumferential direction while meandering in wave-like shapes in the tire width direction. The pair of circumferential primary grooves 12 connects with the shoulder lug grooves 10 at third groove turning portions 11a turned so as to protrude outward in the tire width direction among the primary-groove turning portions 11. The pair of circumferential primary grooves 12 connects with the center lug grooves 14 at fourth groove turning portions 11b turned so as to protrude inward in the tire width direction among the primary-groove turning portions 11. The fourth groove turning portions 11b are shifted in position in the tire circumferential direction with respect to the fourth groove turning portions 11b in the opposite half-tread region. Accordingly, the center lug grooves 14 connecting the fourth groove turning portions 11b in both half-tread regions with each other extend in a direction inclined with respect to the tire width direction.

The wave-like shapes of the pair of circumferential primary grooves 12 each have a predetermined wavelength, and the phases of the two wave-like shapes are mutually shifted by substantially half pitch in the tire circumferential direction. That is, the third groove turning portions 11a of one of the circumferential primary grooves 12 are each positioned, in the tire circumferential direction, between adjacent third groove turning portions 11a in the tire circumferential direction of the other of the circumferential primary grooves 12. The third groove turning portions 11a of one of the circumferential primary grooves 12 and the fourth groove turning portions 11b of the other of the circumferential primary grooves 12 are disposed in substantially the same positions in the tire circumferential direction.

The center lug grooves 14 are provided so as to be separated from each other in the tire circumferential direction. The center lug grooves 14 extend in the tire width direction so as to cross the tire equator line CL, extend in the half-tread regions on the first side and the second side of the tire equator line CL in the tire width direction, and have both ends. Both ends of the center lug grooves 14 connect with the fourth groove turning portions 11b turned so as to protrude inward in the tire width direction among the primary-groove turning portions 11 of the pair of circumferential primary grooves 12. The center lug grooves 14 cross the tire equator line CL.

Figure 4:
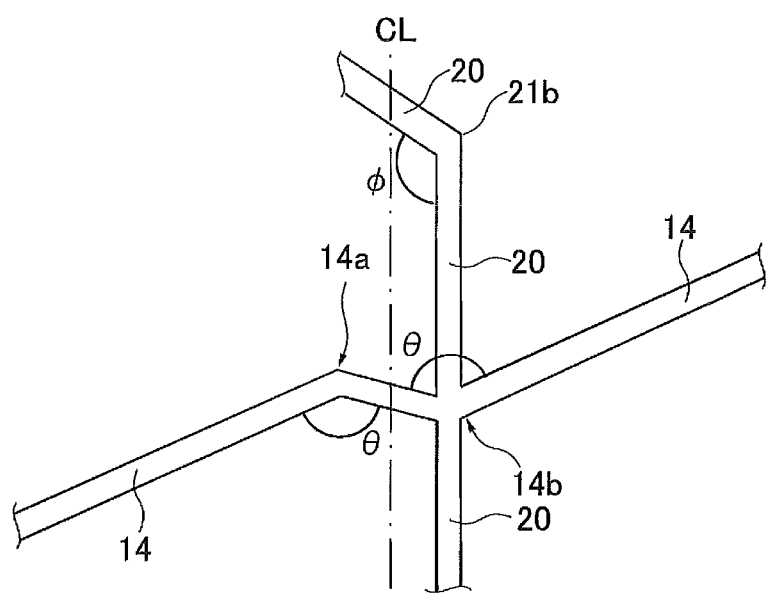
FIG. 4 is an enlarged view of a center lug groove of the tire according to the embodiment.

Each of the center lug grooves 14 is provided with a first groove turning portion 14a and a second groove turning portion 14b that have bent shapes. The center lug groove 14 is provided with the first groove turning portion 14a and the second groove turning portion 14b in the present embodiment but may not be provided with the first groove turning portion 14a and the second groove turning portion 14b. FIG. 4 is an enlarged view of the first groove turning portion 14a and the second groove turning portion 14b that have bent shapes, of the center lug groove 14. The first groove turning portion 14a is disposed in one of the half-tread regions, and the second groove turning portion 14b in the other of the half-tread regions. The first groove turning portion 14a and the second groove turning portion 14b have bent shapes in the present embodiment but may have curved shapes. The curved shape includes a shape formed by rounding a corner of a rubber block adjoining a groove corner with a predetermined radius of curvature, that is, a curved shape of a groove formed by chamfering a corner of a rubber block.

The center lug groove 14 changes its position in the tire circumferential direction so as to have a wave-like shape by including the first groove turning portion 14a and the second groove turning portion 14b. The first groove turning portion 14a and the second groove turning portion 14b have such shapes in which, for example, the center lug groove 14 is turned at an obtuse angle θ (See FIG. 4) formed by the first groove turning portion 14a and the second groove turning portion 14b. The first groove turning portion 14a and the second groove turning portion 14b are preferably disposed in positions remote from the tire equator line CL by the same distance on both sides of the tire equator line CL in the tire width direction. The tire equator line CL passes through a section between the first groove turning portion 14a and the second groove turning portion 14b of the center lug groove 14, and this section of the center lug groove 14 is inclined with respect to the tire width direction differently from the other sections.

The center lug groove 14 according to the present embodiment includes straight sections extending straight, and the first groove turning portion 14a and the second groove turning portion 14b between the pair of circumferential primary grooves 12 but may include grooves having curved shapes instead of the straight sections. One of the first groove turning portion 14a and the second groove turning portion 14b may have a bent shape, and the other may have a curved shape. If the first groove turning portion 14a and the second groove turning portion 14b have curved shapes and grooves having curved shapes are formed instead of the straight sections, the curved shapes of the turned portion and the grooves may have the same radius of curvature. One of the first groove turning portion 14a and the second groove turning portion 14b may have a bent shape formed by connecting a straight shape with a curved shape, and the other may have a curved shape. The center lug groove 14 preferably has a groove shape extending in the tire width direction while changing its position in the tire circumferential direction so as to have a wave-like shape.

Figure 5:
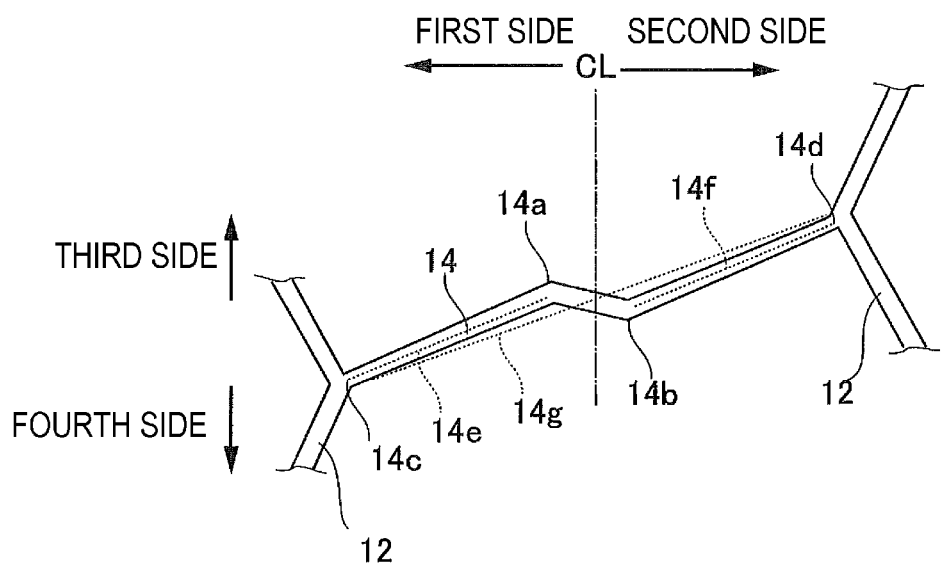
FIG. 5 illustrates a preferred example shape of the center lug groove defining the shape of a center block of the tire according to the embodiment.

FIG. 5 illustrates a preferred example shape of the center lug groove 14 defining the shape of the center block 16.

As illustrated in FIG. 5, the first groove turning portion 14a of the center lug groove 14 is bent or curved so as to protrude toward a third side in the tire circumferential direction (the upper side on paper in FIG. 3) on the first side of the tire equator line CL (the left side on paper in FIG. 4). The second groove turning portion 14b of the center lug groove 14 is bent or curved so as to protrude toward a fourth side in the tire circumferential direction (the lower side on paper in FIG. 3) on the second side of the tire equator line CL (the right side on paper in FIG. 4). The fourth side is opposite to the third side. Here, the center lug groove 14 connects with one of the circumferential primary grooves 12 at a first connection end 14c on the first side and with the other at a second connection end 14d on the second side. The first connection end 14c and the second connection end 14d correspond to tips of the circumferential primary grooves 12 on the inside in the tire width direction, that is, the fourth groove turning portions 11b, 11b. Since the center lug groove 14 is inclined with respect to the tire width direction, the second connection end 14d of the center lug groove 14 is on the third side in the tire circumferential direction (the upper side on paper in FIG. 3) with respect to the first connection end 14c.

Concerning the central position of the center lug groove 14 in the groove width direction, the inclination angle of a first straight line 14e connecting a protruding end, protruding toward the third side in the tire circumferential direction (the upper side in FIG. 3), of the first groove turning portion 14a with the first connection end 14c with respect to the tire width direction (an inclination angle of greater than 0 degrees and less than 90 degrees) and the inclination angle of a second straight line 14f connecting a protruding end, protruding toward the fourth side in the tire circumferential direction, of the second groove turning portion 14b with the second connection end 14d with respect to the tire width direction (an inclination angle of greater than 0 degrees and less than 90 degrees) are preferably greater than the inclination angle of a third straight line 14g connecting the first connection end 14c and the second connection end 14d of the center lug groove 14 with respect to the tire width direction (an inclination angle of greater than 0 degrees and less than 90 degrees).

In a preferred configuration of the present embodiment, concerning the central position of the center lug groove 14 in the groove width direction, a section of the center lug groove 14 between the protruding end, protruding toward the third side in the tire circumferential direction, of the first groove turning portion 14a and the first connection end 14c is on the first straight line 14e or on the third side with respect to the first straight line 14e, and a section of the center lug groove 14 between the protruding end, protruding toward the fourth side in the tire circumferential direction, of the second groove turning portion 14b and the second connection end 14d is on the second straight line 14f or on the fourth side with respect to the second straight line 14f, as illustrated in FIGS. 3, 5.

The center blocks 16 are formed with this configuration, and the tread rigidity of the center blocks 16 is thus enhanced. That is, the center blocks 16 each have an anisotropic shape defined by the center lug grooves 14 inclined in one direction with respect to the tire width direction. When the center block 16 is separated from a road surface and kicked back from a tire contact surface, the anisotropic shape twists the center block 16 clockwise or counterclockwise and deforms the center block 16. At this time, the circumferential primary grooves 12 having a small width allow the center blocks 16 to engage with adjacent shoulder blocks in the tire width direction across the circumferential primary grooves 12 at the third groove turning portions 11a and the fourth groove turning portions 11b and to function integrally. In addition, adjacent center blocks 16 in the tire circumferential direction across the center lug grooves 14 engage with each other at the first groove turning portions 14a and the second groove turning portions 14b and function integrally. The two kinds of engagement can enhance tread rigidity of the center blocks 16. The enhanced tread rigidity of the center blocks 16 prevents the center blocks 16 from being twisted and prevents local wear of the center blocks 16 on both sides of the center lug grooves 14 in the tire circumferential direction.

When the center blocks 16 are separated and kicked back from a road surface, shear force is applied from the road surface to sections of the center blocks 16 in the tire circumferential direction and thus deforms the sections to fall. At this time, the first groove turning portions 14a and the second groove turning portions 14b of the center lug grooves 14 allow land portions, around the first groove turning portions 14a and the second groove turning portions 14b, of the center blocks 16 to engage with each other, and thus allow two adjacent blocks in the tire circumferential direction to function as one block and to generate counter force. Accordingly, the first groove turning portions 14a and the second groove turning portions 14b provided in the center lug grooves 14 can enhance tread rigidity of the center blocks 16. The enhanced tread rigidity of the center blocks 16 prevents the center blocks 16 from falling and prevents local wear of the center blocks 16 on both sides of the center lug grooves 14 in the tire circumferential direction.

The center blocks 16 are defined by the center lug grooves 14 and the pair of circumferential primary grooves 12 and are aligned in a row in the tire circumferential direction. The tire equator line (tire center line) CL passes through the center blocks 16.

The circumferential secondary groove 20 extends along the tire equator line CL in the tire circumferential direction so as to divide the regions of the center blocks 16. The circumferential secondary groove 20 connects with pairs of two adjacent center lug grooves 14 in the tire circumferential direction. The depth of the circumferential secondary groove 20 is less than the maximum depth of the circumferential primary grooves 12.

As illustrated in FIG. 3, the circumferential secondary groove 20 includes straight sections extending from the center lug grooves 14 parallel to the tire circumferential direction, fifth groove turning portions 21a and sixth groove turning portions 21b connecting with the straight sections and having bent shapes so as to change the groove extending direction, and inclined sections extending between the fifth groove turning portions 21a and the sixth groove turning portions 21b and inclined with respect to the tire circumferential direction. As illustrated in FIG. 4, the sixth groove turning portions 21b of the circumferential secondary groove 20 have such a shape that the circumferential secondary groove 20 is turned at an obtuse angle φ (See FIG. 4) formed by the sixth groove turning portions 21b. The fifth groove turning portions 21a also have such a shape that the circumferential secondary groove 20 is turned at an obtuse angle formed by the fifth groove turning portions 21a.

The circumferential secondary groove 20 is provided with the fifth groove turning portions 21a and the sixth groove turning portions 21b but may not necessarily be provided with the fifth groove turning portions 21a and the sixth groove turning portions 21b.

Each of sections of the circumferential secondary groove 20 illustrated in FIG. 4 is provided with one of the fifth groove turning portions 21a and one of the sixth groove turning portions 21b but may be provided with one groove turning portion or three or greater groove turning portions. In this case, the straight sections of the circumferential secondary groove 20 may not extend parallel to the tire circumferential direction. As illustrated in FIG. 4, the tire equator line CL preferably passes through the sections connecting the fifth groove turning portions 21a with the sixth groove turning portions 21b of the circumferential secondary groove 20.

The circumferential secondary groove 20 is preferably disposed so as to connect the first groove turning portions 14a of the center lug grooves 14 with the second groove turning portions 14b of the center lug grooves 14 adjacent to the former center lug grooves 14 in the tire circumferential direction. The second groove turning portions 14b are disposed in the half-tread region different from the half-tread region provided with the first groove turning portions 14a. The circumferential secondary groove 20 preferably connects with each of the center lug grooves 14 at any one of the first groove turning portion 14a and the second groove turning portion 14b from both sides in the tire circumferential direction (the lower and upper sides on paper in FIG. 4). To yield this connection configuration of the circumferential secondary groove 20, the extending direction of the circumferential secondary groove 20 connecting the pairs of two adjacent center lug grooves 14 in the tire circumferential direction preferably changes to a different direction, such as the clockwise direction or the counterclockwise direction, at the fifth groove turning portions 21a and the sixth groove turning portions 21b of the circumferential secondary groove 20 as the circumferential secondary groove 20 extends in the tire circumferential direction.

That is, preferably, the circumferential secondary groove 20 is formed over the entire periphery of the tire along the tire equator line CL and crosses the center lug grooves 14 so as to penetrate the center lug grooves 14 in regions between and inclusive of the first groove turning portions 14a and the second groove turning portions 14b in the tire width direction.

At this time, the fifth groove turning portions 21a are curved or bent so as to change their directions clockwise when the tread pattern is viewed from the outside toward the inside in the tire radial direction in traveling toward the third side in the tire circumferential direction. The sixth groove turning portions 21b are curved or bent so as to change their directions counterclockwise when the tread pattern is viewed from the outside toward the inside in the tire radial direction in traveling toward the third side in the tire circumferential direction. The fifth groove turning portions 21a and the sixth groove turning portions 21b are disposed on the periphery of the tire. Each of sections of the circumferential secondary groove 20 between adjacent center lug grooves 14 among the center lug grooves 14 is provided with one of the fifth groove turning portions 21a and one of the sixth groove turning portions 21b.

At this time, preferably, the circumferential secondary groove 20 is provided with pairs of two successive fifth groove turning portions 21a and pairs of two successive sixth groove turning portions 21b in the tire circumferential direction, and the center lug grooves 14 cross between each of the pairs of two successive fifth groove turning portions 21a and between each of the pairs of two successive sixth groove turning portions 21b, as illustrated in FIG. 3.

The circumferential secondary groove 20 is provided, on the periphery of the tire, with a plurality of sets of one of the fifth groove turning portions 21a, another of the fifth groove turning portions 21a, one of the sixth groove turning portions 21b, and another of the sixth groove turning portions 21b that are arranged successively in the tire circumferential direction. At this time, a section between the one fifth groove turning portion 21a and the other fifth groove turning portion 21a and a section between the one sixth groove turning portion 21b and the other sixth groove turning portion 21b, of the circumferential secondary groove 20 are preferably straight grooves extending parallel to the tire equator line CL.

The fifth groove turning portions 21a and the sixth groove turning portions 21b may have curved shapes instead of the bent shapes. The curved shape includes a shape formed by rounding a corner of a rubber block adjoining a groove corner with a predetermined radius of curvature, that is, a curved shape of a groove formed by chamfering a corner of a rubber block. One of the two secondary-groove turning portions 21 may have a bent shape, and the other may have a curved shape.

The straight sections of the circumferential secondary groove 20 have a shape extending parallel to the tire circumferential direction. Alternatively, the straight sections may have curved shapes. If the fifth groove turning portions 21a and the sixth groove turning portions 21b have curved shapes and the straight sections have curved shapes, the curved shapes of the turned portions and the straight sections may have the same radius of curvature. One of the fifth groove turning portions 21a and the sixth groove turning portions 21b may have a bent shape formed by connecting a straight shape with a curved shape, and the other may have a curved shape. The circumferential secondary groove 20 has a shape formed by including the straight sections, the fifth groove turning portions 21a and the sixth groove turning portions 21b, and the inclined sections as described above. Alternatively, the circumferential secondary groove 20 may extend in the tire circumferential direction while changing its position in the tire circumferential direction so as to have a wave-like shape.

The width of the pair of circumferential primary grooves 12 is less than the width of the shoulder lug grooves 10 as described above. Accordingly, the maximum width WB of the center blocks 16 in the tire width direction can be greater than in conventional tires (See FIG. 3), and traction performance can thus be improved further than in conventional tires. The increased maximum width WB of the center blocks 16 causes high ground contact pressure to be applied to the vicinities of edges of the center blocks 16. Thus, the vicinities of ends of the belts in the belt portion 6 that are in the same positions in the tire width direction as the edges of the center blocks 16 in the tire width direction readily receive great force inward in the tire radial direction. The edges of the belts are strained significantly in the vicinities of the belt ends, resulting in ready occurrence of separation of the belt edges. To prevent this separation, the belt portion 6 according to the present embodiment has a configuration described below.

That is, the fourth and subsequent belts from the innermost belt in the tire radial direction toward the outside in the tire radial direction in the above-described laminated structure of the belt portion 6, which are the fourth belt 64, the fifth belt 65, and the sixth belt 66 in the belt structure illustrated in FIG. 2, each have a width equal to or greater than the maximum width WB of the center blocks 16 in the tire width direction. This belt configuration and the above-described ratio W8/W7 relating to the belts that is 0.75 or greater and 0.90 or less can prevent separation of the belt edges as it can be seen from Working Examples described later. If the ratio W8/W7 exceeds 0.9 and is close to 1, the edges of the belts are too close to each other in the belt portion 6, resulting in an increased strain of adjacent belt edges. A ratio W8/W7 of less than 0.75 decreases belt rigidity in the tire circumferential direction and thus increases strain of belt edges.

In the tread pattern of the tire 1, the circumferential primary grooves 12 having wave-like shapes can disperse stress applied by uneven spots of a road surface to the edges of the center blocks 16, and the edges are difficult to be a starting point of a cut.

The circumferential secondary groove 20 provided in the center block 16 regions can improve enveloping properties, which are to receive uneven spots of a road surface by deforming the tread rubber, of the center blocks 16 having the maximum width WB greater than in conventional tires. This configuration can reduce force applied to the central section of a belt positioned inside in the tire radial direction in the center block 16 regions.

Figure 6:
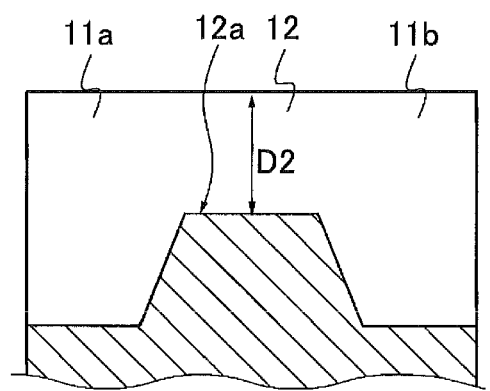
FIG. 6 illustrates an example raised bottom portion in a circumferential primary groove of the tire according to the embodiment.

The tread pattern preferably includes a raised bottom portion 12a formed by partially making a groove depth smaller in each of the circumferential primary grooves 12. FIG. 6 illustrates an example raised bottom portion 12a. The raised bottom portion 12a provided in the circumferential primary groove 12 provides suitable tread rigidity of the center blocks 16 and can thus prevent the center blocks 16 from deforming to fall. This prevention is effective to yield traction performance. The center blocks 16 prevented from deforming to fall do not apply excess force to the belt portion 6, resulting in a reduction of strain of the belt edges in the vicinities of the ends of the belt portion 6. The raised bottom portion 12a illustrated in FIG. 6 is disposed in a section extending while being inclined with respect to the tire circumferential direction between the third groove turning portion 11a and the fourth groove turning portion 11b but may be disposed in a section including the third groove turning portion 11a and the fourth groove turning portion 11b in the circumferential primary groove 12. The circumferential primary groove 12 has a maximum depth region having the constant, greatest depth, and a section having a depth less than that of the maximum depth region is the raised bottom portion 12a. The greatest depth of the circumferential primary groove 12 is preferably the same as the depth of the shoulder lug grooves 10.

The raised bottom portion 12a may be formed by making the depth smaller stepwise and discontinuously from the maximum depth region, by making the depth smaller continuously from the maximum depth region, or by making the depth smaller from the maximum depth region and then greater without making the depth greater than the depth of the maximum depth region. In this way, the raised bottom portion 12a may have a constant, small depth but may not necessarily be a constant, small depth and may have varying depths.

At this time, the ratio D2/T of the smallest depth D2 (See FIG. 6) of the raised bottom portion 12a to a tread width T (See FIG. 3) of the tread portion 2 is preferably less than 0.05. This configuration significantly prevents the center blocks 16 from deforming to fall, and excess force is not thus applied to the belts, resulting in a significant reduction of strain of the belt edges in the vicinities of the belt ends. A ratio D2/T of 0.05 or greater indicates that the raised bottom portion 12a is deeper by the above-described ratio to the tread width T and causes the center blocks 16 to be difficult to prevent from deforming to fall, and strain of the belt edges in the vicinities of the belt ends is thus difficult to reduce sufficiently. The ratio D2/T is more preferably 0.04 or less, for example, 0.03. The lower limit of the ratio D2/T is not limited but is, for example, 0.01. A ratio D2/T of 0.05 or greater indicates that the raised bottom portion 12a is deeper than at the above-described ratio to the tread width T and causes a greater difference between the block rigidity of the center blocks 16 around the raised bottom portion and the block rigidity of the central sections of the center blocks 16 (the inner sections remote from the edges of the groove provided with the raised bottom portion), resulting in ready occurrence of uneven wear. The tread width T refers to a periphery length along the outer curved shape of the tread portion 2 between the tread ends 18 on both sides on the tire width direction.

In the present embodiment, the fifth groove turning portions 21a and the sixth groove turning portions 21b provided in the circumferential secondary groove 20 can prevent force applied by a road surface to the center blocks 16 from concentrating in the same position in the tire width direction, in comparison with the case where the circumferential secondary groove 20 is not provided with the fifth groove turning portions 21a and the sixth groove turning portions 21b and extends straight in the tire circumferential direction. Accordingly, force applied to the central section of the belt portion 6 positioned inside in the tire radial direction in the center block 16 regions can be dispersed.

In the present embodiment, the orientations of the reinforcing cords of the belt having greater widths in the belt pairs in the belt portion 6 are preferably inclined toward the same side in the tire width direction with respect to the tire circumferential direction, as indicated by the arrows indicating the orientations of the reinforcing cords in FIG. 2. In this configuration of the orientations of the reinforcing cords, even with the first belt 61 and the third belt 63, and the third belt 63 and the fifth belt 65 being adjacent to each other in the tire radial direction in the vicinities of the ends thereof, strain between the belt layers is difficult to occur because the reinforcing cords are inclined toward the same side in the tire width direction. Accordingly, separation between the first belt 61 and the third belt 63 and between the third belt 63 and the fifth belt 65 can be prevented in the vicinities of the belt ends.

Preferably, pairs of adjacent belts in the belt portion 6 each form cross layers by inclining the reinforcing cords of the belts toward opposite sides in the tire width direction with respect to the tire circumferential direction, as illustrated in FIG. 2. This configuration of the reinforcing cords can enhance belt rigidity in the tire circumferential direction. Accordingly, all of the adjacent belt pairs can have enhanced hoop effect, in which the tire is prevented from deforming to expand in the tire radial direction because of the belts extending in the tire circumferential direction.

As illustrated in FIG. 2, a belt positioned closer to the outside in the tire radial direction preferably has a greater width among the belts having greater widths in the pairs of belts in the belt portion 6. In the example illustrated in FIG. 2, the belt widths preferably become greater in the order of the first belt 61, the third belt 63, and the fifth belt 65. This configuration gradually increases belt rigidity in the tire circumferential direction toward the outside in the tire radial direction and thus disperses strain between the belt layers, resulting in a prevention of separation between the belt layers.

If the belt portion 6 includes the first cross belt layer 6a being a first belt pair positioned innermost in the tire radial direction, the second cross belt layer 6b being a second belt pair laminated outside the first cross belt layer 6a in the tire radial direction, and the third cross belt layer 6c being a third belt pair laminated outside the second cross belt layer 6b in the tire radial direction as in the example illustrated in FIG. 2, the ratio WB/W3 of the maximum width WB of the center blocks 16 to the width W3 (See FIG. 2) of the sixth belt 66 having a smaller width in the third cross belt layer 6c is preferably 0.5 or greater and 0.8 or less, and the width W3 is preferably greater than the width W2 (See FIG. 2) of the belt 64 having a smaller width in the second cross belt layer 6b. If the ratio WB/W3 is 0.5 or greater and 0.8 or less and the width W3 is greater than the width W2, force in the tire radial direction is equally applied to the belts of the tire in the region of the ground contact surface, coming into contact with a road surface, of the tread portion 2, resulting in a reduction of strain of the belt edges and prevention of separation of the belt edges. The ratio WB/W3 is more preferably 0.55 or greater and 0.75 or less.

The width W1 of the second belt 62 having a smaller width in the first cross belt layer 6a being the first belt pair positioned innermost in the tire radial direction is preferably less than the maximum width WB of the center blocks 16.

In the present embodiment, if the center blocks 16 have corners in correspondence with the circumferential primary grooves 12, peaks, adjoining the circumferential primary grooves 12, of the center blocks 16 are preferably corners having obtuse angles. The corners having obtuse angles can prevent force applied from a road surface from concentrating at the corners, resulting in an enhancement in tire durability as well as wear proof of the tread portion 2.

The widths of the pair of circumferential primary grooves 12 and the center lug grooves 14 are preferably 7 to 20 mm. This groove width can enhance enveloping properties of the tread portion 2 and reduce force applied to the central sections of the belts.

The tire 1 is preferably fitted to construction or industrial vehicles. Construction or industrial vehicles include dump trucks, scrapers, graders, shovel loaders, tire rollers, wheel cranes, and truck cranes, or vehicles, such as compactors, earthmovers, graders, and loaders and dozers.

WORKING EXAMPLES, CONVENTIONAL EXAMPLE, COMPARATIVE EXAMPLES

Various tires having the structure illustrated in FIG. 1 and different belt widths and tread patterns were prepared to check effect of the tire according to the present embodiment.

Separation of the belt edges was checked. The size of the prepared tires was 46/90R57. The tires were mounted on 29.00-6.0 rims (TRA specified rim). A separation test was conducted under test conditions of an air pressure of 700 kPa (TRA specified air pressure) and an applied load of 617.81 kN (TRA specified load).

In the separation test, each of the tires ran with an indoor drum at a speed of 15 km/hour continuously until belt separation occurred. Separation was evaluated using running time of the tire until the occurrence of separation of belt edges. The running time was indexed with reference to the running time of Conventional Example (index of 100). The tables below show evaluation results of separation between belt layers using the indices. A greater index indicates a longer running time of the tire and thus indicates a tire that is more tolerant of separation.

The tires were prepared for Conventional Example, Comparative Examples 1 to 6, and Working Examples 1 to 19.

Figure 7:
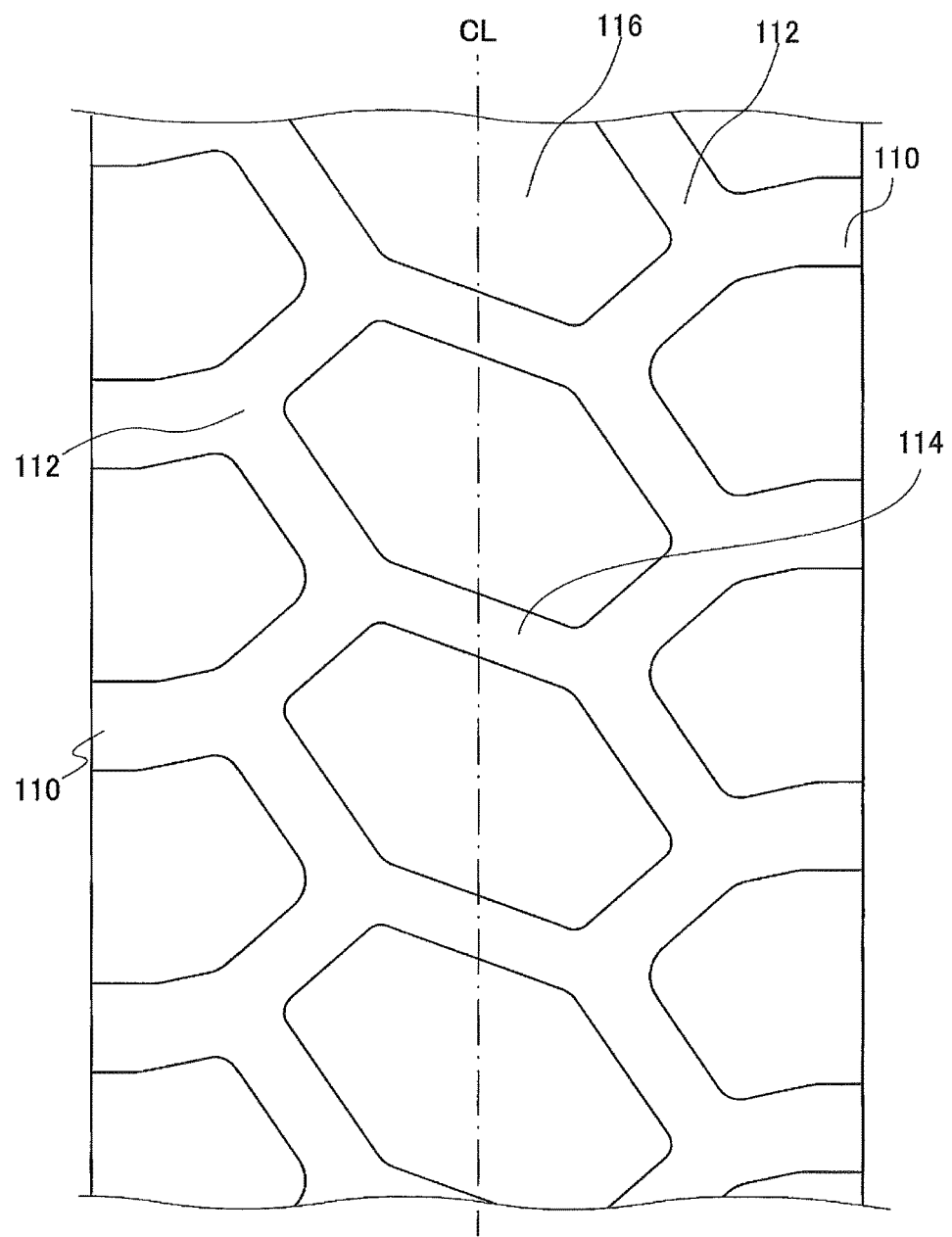
FIG. 7 illustrates a tread pattern of a conventional tire.

FIG. 7 illustrates the tread pattern of Conventional Example. The tread pattern illustrated in FIG. 7 includes shoulder lug grooves 110, a pair of circumferential primary grooves 112, center lug grooves 114, and center blocks 116. The shoulder lug grooves 110, the pair of circumferential primary grooves 112, the center lug grooves 114, and the center blocks 116 respectively have similar configurations to the shoulder lug grooves 10, the pair of circumferential primary grooves 12, the center lug grooves 14, and the center blocks 16; however, the shoulder lug grooves 110 and the circumferential primary grooves 112 have the same width. Since the circumferential primary grooves 112 having the same width as that of the shoulder lug grooves 110 are different from the circumferential primary grooves 12 having a smaller width than that of the shoulder lug grooves 10, Table 2 below shows "Absent" for "Circumferential primary groove having a wave-like shape" of Conventional Example.

The tread pattern illustrated in FIG. 2 was applied to Comparative Examples 1 to 6 and Working Examples 1 to 19.

Table 1 below shows inclination angles of orientations of reinforcing cords of belts with respect to the tire circumferential direction and belt widths in Conventional Example, Comparative Examples 1 to 6, and Working Examples 1 to 19. "+" for an inclination angle of an orientation of a reinforcing cord indicates that the reinforcing cord is inclined (oriented) toward the top right with respect to the tire circumferential direction when viewed with the tire circumferential direction being vertical, and "−" for an inclination angle indicates that the reinforcing cord is inclined (oriented) toward the top left with respect to the tire circumferential direction. The belt widths are expressed in percentage of the maximum width WB of the center blocks 16 in the tread pattern applied to Working Example 1.

Comparative Examples 1 to 6 and Working Examples 1 to 19 had the tread pattern illustrated in FIG. 2 and had the same fixed tread width T and maximum width WB of the center blocks 16.

The ratios W8/W7 in some of Working Examples 1 to 19 are slightly outside the range of 0.75 to 0.90 by strict measurement but are within the range of 0.75 to 0.90 by rounding off the number the second decimal place. For example, the ratio W8/W7 in Working Example 1 is 0.748 (=140%/187%), which is less than 0.75, by strict measurement but is 0.75 by rounding off the number to the second decimal place. The ratio W8/W7 in Working Example 3 is 0.903 (=130%/144%), which is greater than 0.90, by strict measurement but is 0.90 by rounding off the number to the second decimal place.

TABLE 1

|  | Number of belts | Inclination angles (first belt, second belt, third belt, . . .) | Belt widths (first belt, second belt, third belt, . . .) |
| --- | --- | --- | --- |
| Conventional Example | 3 | −20°, −15°, +20° | 135%, 95%, 120% |
| Comparative Example 1 | 3 | Same as above | Same as above |
| Comparative Example 2 | 3 | Same as above | Same as above |
| Comparative Example 3 | 4 | −20°, −18°, +17°, −17° | 160%, 112%, 150%, 105% |
| Comparative Example 4 | 6 | −22°, +24°, −22°, +18°, +27°, −24° | 215%, 150%, 171%, 120%, 317%, 222% |
| Working Example 1 | 6 | Same as above | 187%, 140%, 160%, 120%, 296%, 222% |
| Working Example 2 | 4 | −20°, −18°, +17°, −17° | 153%, 115%, 133%, 100% |
| Working Example 3 | 4 | −20°, −18°, +17°, −17° | 144%, 130%, 111%, 100% |
| Working Example 4 | 6 | −9°, +9°, −30°, +18°, +30°, −27° | 167%, 150%, 111%, 100%, 247%, 222% |
| Comparative Example 5 | 6 | Same as above | 150%, 150%, 110%, 110%, 222%, 222% |
| Working Examples 5 to 9 | 6 | Same as above | 187%, 150%, 125%, 100%, 277%, 222% |
| Working Example 10 | 6 | −9°, +9°, −30°, +18°, −30°, +27° | Same as above |
| Working Examples 11 to 19 | 6 | Same as above | 162%, 130%, 215%, 172%, 250%, 200% |
| Comparative Example 6 | 6 | Same as above | 120%, 120%, 70%, 70%, 91%, 91% |

The tires had various tread patterns shown in Tables 2 to 5 below as well as the above belt structures. Separation of belts was evaluated with these configurations.

TABLE 2

|  | Conventional Example | Comparative Example 1 | Comparative Example 2 |
|---|---|---|---|
| Presence of circumferential primary grooves | Absent | Present | Present |
| Presence of circumferential secondary groove | Absent | Absent | Present |
| Number of belt layers | 3 | 3 | 3 |
| Whether belt widths of fourth and subsequent belts are equal to, greater than, or smaller than maximum width WB | — | — | — |
| Ratio W8/W7 | — | — | — |
| Presence of raised bottom portions | Absent | Absent | Absent |
| D2/T | — | — | — |
| Presence of fifth and sixth groove turning portions in circumferential secondary groove | Absent | — | Absent |
| Whether reinforcing cords of wider belt layers have the same orientation | — | — | — |
| Whether adjacent belt layers form a cross layer | No | No | No |
| Whether width of wider belt layer positioned closer to outside in tire radial direction is greater | — | No | No |
| Ratio WB/W3 | — | 0.4 | 0.4 |
| Whether corners of center blocks have obtuse angle or acute angle (angle) | Acute (85°) | Acute (85°) | Acute (85°) |
| Width of circumferential primary grooves and center lug grooves (mm) | — | 5 mm | 5 mm |
| Evaluation of separation | 100 | 105 | 106 |

|  | Comparative Example 3 | Comparative Example 4 | Working Example 1 | Working Example 2 |
|---|---|---|---|---|
| Presence of circumferential primary grooves | Present | Present | Present | Present |
| Presence of circumferential secondary groove | Present | Present | Present | Present |
| Number of belt layers | 4 (2 pairs) | 6 (3 pairs) | 6 (3 pairs) | 4 (2 pairs) |
| Whether belt widths of fourth and subsequent belts are equal to, greater than, or smaller than maximum width WB | Greater | Greater | Greater | Equal |
| Ratio W8/W7 | 0.7 | 0.7 | 0.75 | 0.75 |
| Presence of raised bottom portions | Absent | Absent | Absent | Absent |
| D2/T | — | — | — | — |
| Presence of fifth and sixth groove turning portions in circumferential secondary groove | Absent | Absent | Absent | Absent |

TABLE 2-continued

|  |  |  |  |  |
|---|---|---|---|---|
| Whether reinforcing cords of wider belt layers have the same orientation | No | No | No | No |
| Whether adjacent belt layers form a cross layer | No | No | No | No |
| Whether width of wider belt layer positioned closer to outside in tire radial direction is greater | No | No | No | No |
| Ratio WB/W3 | 0.4 | 0.45 | 0.45 | 0.4 |
| Whether corners of center blocks have obtuse angle or acute angle (angle) | Acute (85°) | Acute (85°) | Acute (85°) | Acute (85°) |
| Width of circumferential primary grooves and center lug grooves (mm) | 5 mm | 5 mm | 5 mm | 5 mm |
| Evaluation of separation | 115 | 120 | 130 | 125 |

TABLE 3

|  | Working Example 3 | Working Example 4 | Comparative Example 5 | Working Example 5 | Working Example 6 | Working Example 7 | Working Example 8 |
|---|---|---|---|---|---|---|---|
| Presence of circumferential primary grooves | Present | Present | Present | Present | Present | Present | Present |
| Presence of circumferential secondary groove | Present | Present | Present | Present | Present | Present | Present |
| Number of belt layers | 4 (2 pairs) | 6 (3 pairs) | 6 (3 pairs) | 6 (3 pairs) | 6 (3 pairs) | 6 (3 pairs) | 6 (3 pairs) |
| Whether belt widths of fourth and subsequent belts are equal to, greater than, or smaller than maximum width WB | Equal | Equal or greater | Greater | Equal or greater | Equal or greater | Equal or greater | Equal or greater |
| Ratio W8/W7 | 0.90 | 0.90 | 1.0 | 0.8 | 0.8 | 0.8 | 0.8 |
| Presence of raised bottom portions | Absent | Absent | Absent | Present | Present | Present | Present |
| D2/T | — | — | — | 0.05 | 0.048 | 0.04 | 0.03 |
| Presence of fifth and sixth groove turning portions in circumferential secondary groove | Absent | Absent | Absent | Absent | Absent | Absent | Absent |
| Whether reinforcing cords of wider belt layers have the same orientation | No | No | No | No | No | No | No |
| Whether adjacent belt layers form a cross layer | No | No | No | No | No | No | No |
| Whether width of wider belt layer positioned closer to outside in tire radial direction is greater | No | No | No | No | No | No | No |
| Ratio WB/W3 | 0.4 | 0.45 | 0.45 | 0.45 | 0.45 | 0.45 | 0.45 |
| Whether corners of center blocks have obtuse angle or acute angle (angle) | Acute (85°) | Acute (85°) | Acute (85°) | Acute (85°) | Acute (85°) | Acute (85°) | Acute (85°) |
| Width of circumferential primary grooves and center lug grooves (mm) | 5 mm | 5 mm | 5 mm | 5 mm | 5 mm | 5 mm | 5 mm |
| Evaluation of separation | 126 | 132 | 120 | 137 | 138 | 140 | 143 |

TABLE 4

| | Working Example 9 | Working Example 10 | Working Example 11 |
|---|---|---|---|
| Presence of circumferential primary grooves | Present | Present | Present |
| Presence of circumferential secondary groove | Present | Present | Present |
| Number of belt layers | 6 (3 pairs) | 6 (3 pairs) | 6 (3 pairs) |
| Whether belt widths of fourth and subsequent belts are equal to, greater than, or smaller than maximum width WB | Equal or greater | Equal or greater | Greater |
| Ratio W8/W7 | 0.8 | 0.8 | 0.8 |
| Presence of raised bottom portions | Present | Present | Present |
| D2/T | 0.03 | 0.03 | 0.03 |
| Presence of fifth and sixth groove turning portions in circumferential secondary groove | Present | Present | Present |
| Whether reinforcing cords of wider belt layers have the same orientation | No | Same | Same |
| Whether adjacent belt layers form a cross layer | No | Cross layer | Cross layer |
| Whether width of wider belt layer positioned closer to outside in tire radial direction is greater | No | No | Wider |
| Ratio WB/W3 | 0.45 | 0.45 | 0.5 |
| Whether corners of center blocks have obtuse angle or acute angle (angle) | Acute (85°) | Acute (85°) | Acute (85°) |
| Width of circumferential primary grooves and center lug grooves (mm) | 5 mm | 5 mm | 5 mm |
| Evaluation of separation | 147 | 155 | 158 |

| | Working Example 12 | Working Example 13 | Working Example 14 |
|---|---|---|---|
| Presence of circumferential primary grooves | Present | Present | Present |
| Presence of circumferential secondary groove | Present | Present | Present |
| Number of belt layers | 6 (3 pairs) | 6 (3 pairs) | 6 (3 pairs) |
| Whether belt widths of fourth and subsequent belts are equal to, greater than, or smaller than maximum width WB | Greater | Greater | Greater |
| Ratio W8/W7 | 0.8 | 0.8 | 0.8 |
| Presence of raised bottom portions | Present | Present | Present |
| D2/T | 0.03 | 0.03 | 0.03 |
| Presence of fifth and sixth groove turning portions in circumferential secondary groove | Present | Present | Present |
| Whether reinforcing cords of wider belt layers have the same orientation | Same | Same | Same |
| Whether adjacent belt layers form a cross layer | Cross layer | Cross layer | Cross layer |
| Whether width of wider belt layer positioned closer to outside in tire radial direction is greater | Wider | Wider | Wider |
| Ratio WB/W3 | 0.75 | 0.8 | 0.9 |
| Whether corners of center blocks have obtuse angle or acute angle (angle) | Acute (85°) | Acute (85°) | Acute (85°) |
| Width of circumferential primary grooves and center lug grooves (mm) | 5 mm | 5 mm | 5 mm |
| Evaluation of separation | 160 | 159 | 157 |

TABLE 5

| | Working Example 15 | Working Example 16 | Working Example 17 |
|---|---|---|---|
| Presence of circumferential primary grooves | Present | Present | Present |
| Presence of circumferential secondary groove | Present | Present | Present |
| Number of belt layers | 6 (3 pairs) | 6 (3 pairs) | 6 (3 pairs) |
| Whether belt widths of fourth and subsequent belts are equal to, greater than, or smaller than maximum width WB | Greater | Greater | Greater |
| Ratio W8/W7 | 0.8 | 0.8 | 0.8 |
| Presence of raised bottom portions | Present | Present | Present |
| D2/T | 0.03 | 0.03 | 0.03 |
| Presence of fifth and sixth groove turning portions in circumferential secondary groove | Present | Present | Present |
| Whether reinforcing cords of wider belt layers have the same orientation | Same | Same | Same |
| Whether adjacent belt layers form a cross layer | Cross layer | Cross layer | Cross layer |
| Whether width of wider belt layer positioned closer to outside in tire radial direction is greater | Greater | Greater | Greater |
| Ratio WB/W3 | 0.75 | 0.75 | 0.75 |
| Whether corners of center blocks have obtuse angle or acute angle (angle) | Obtuse (100°) | Obtuse (100°) | Obtuse (100°) |
| Width of circumferential primary grooves and center lug grooves (mm) | 7 mm | 10 mm | 15 mm |

TABLE 5-continued

|  | Working Example 18 | Working Example 19 | Comparative Example 6 |
|---|---|---|---|
| Evaluation of separation | 165 | 166 | 166 |
| Presence of circumferential primary grooves | Present | Present | Present |
| Presence of circumferential secondary groove | Present | Present | Present |
| Number of belt layers | 6 (3 pairs) | 6 (3 pairs) | 6 (3 pairs) |
| Whether belt widths of fourth and subsequent belts are equal to, greater than, or smaller than maximum width WB | Greater | Greater | Smaller |
| Ratio W8/W7 | 0.8 | 0.8 | 1.0 |
| Presence of raised bottom portions | Present | Present | Absent |
| D2/T | 0.03 | 0.03 | 0.06 |
| Presence of fifth and sixth groove turning portions in circumferential secondary groove | Present | Present | Absent |
| Whether reinforcing cords of wider belt layers have the same orientation | Same | Same | No |
| Whether adjacent belt layers form a cross layer | Cross layer | Cross layer | Cross layer |
| Whether width of wider belt layer positioned closer to outside in tire radial direction is greater | Greater | Greater | No |
| Ratio WB/W3 | 0.75 | 0.75 | 1.1 |
| Whether corners of center blocks have obtuse angle or acute angle (angle) | Obtuse (100°) | Obtuse (100°) | Acute (85°) |
| Width of circumferential primary grooves and center lug grooves (mm) | 20 mm | 22 mm | 5 mm |
| Evaluation of separation | 165 | 160 | 130 |

From Comparative Examples 1 to 6 and Working Examples 1 to 4, it is understood that separation between belt layers is prevented effectively by including the circumferential primary grooves and the circumferential secondary groove, including four or greater belts, that is, two or greater belt pairs, having a ratio W8/W7 of 0.75 to 0.9, and including the fourth and subsequent belts from the innermost side in the tire radial direction having widths equal to or wider than the maximum width WB.

From Working Examples 5 to 8, it is understood that the raised bottom portions 12a provided in the circumferential primary grooves 12 are preferable to prevent separation between belt layers and that, at this time, a ratio D2/T of less than 0.5, preferably 0.48 or less, is preferable.

From Working Examples 8, 9, it is understood that the fifth groove turning portions 21a and the sixth groove turning portions 21b provided in the circumferential secondary groove 20 are preferable to prevent separation between belt layers.

From Working Examples 9, 10, it is understood that the reinforcing cords of the wider-width belts in the belt pairs having the same orientation and adjacent belts in the tire radial direction forming a cross layer (the orientations of the reinforcing cords of the belts being inclined toward opposite sides in the tire width direction with respect to the tire circumferential direction) are preferable to prevent separation between belt layers.

From Working Examples 11 to 14, it is understood that a ratio WB/W3 of 0.5 to 0.8 and the belt width W3 greater than the belt width W2 are preferable to prevent separation between belt layers.

From Working Examples 15 to 19, it is understood that widths of 7 to 20 mm of the circumferential primary grooves 12 and the center lug grooves 14 are preferable to prevent separation between belt layers.

This clearly demonstrates the effect of the present embodiment.

The foregoing has been a detailed description of the pneumatic tire of the present technology. However, the present technology is not limited to the above embodiments and Working Examples, and may be improved or modified in various ways within the scope of the present technology.

The invention claimed is:

1. A heavy-duty pneumatic tire comprising a tread pattern and a belt portion, the tread pattern comprising:

a plurality of center lug grooves separated from each other in a tire circumferential direction, the center lug grooves extending in half-tread regions on a first side and a second side of a tire equator line in a tire width direction so as to cross the tire equator line, and the center lug grooves including both ends;

shoulder lug grooves positioned, in the tire circumferential direction, between adjacent center lug grooves in the tire circumferential direction among the center lug grooves, the shoulder lug grooves extending outward in the tire width direction in the half-tread regions, and the shoulder lug grooves having ends on an outside in the tire width direction opening at ground contact ends on both sides in the tire width direction and ends on an inside in the tire width direction being positioned outward in the tire width direction with respect to ends of the center lug grooves;

a pair of circumferential primary grooves formed in wave-like shapes in the respective half-tread regions over an entire periphery of the tire by alternately connecting the ends of the center lug grooves and the ends of the shoulder lug grooves on the inside in the tire width direction, the circumferential primary grooves having a smaller width than a width of the shoulder lug grooves;

a plurality of center blocks defined by the center lug grooves and the pair of circumferential primary grooves and aligned in a row in the tire circumferential direction; and a circumferential secondary groove extending along the tire equator line in the tire circumferential direction so as to divide regions of the center blocks;

the belt portion comprising at least a first belt disposed on an innermost side in a tire radial direction, a second belt having a different width from the first belt, a third belt, and a fourth belt having a different width from the third belt in order from the first belt toward an outside in the tire radial direction, the belt portion having a laminated structure of belt layers composed of at least two belt pairs, the two belt pairs being a pair of the first belt and the second belt and a pair of the third belt and the fourth belt;

the belt pairs of the belt layers each having a ratio W8/W7 of 0.75 or greater and 0.80 or less, the ratio indicating a width W8 of a belt having a smaller width in the belt layer to a width W7 of a belt having a greater width in the belt layer; and fourth and subsequent belts from an innermost belt in the tire radial direction toward the outside in the tire radial direction in the laminated structure of the belt portion each having a width equal to or greater than a maximum width WB of the center blocks in the tire width direction.

2. The heavy-duty pneumatic tire according to claim 1, wherein the circumferential primary grooves each comprise a raised bottom portion formed by partially making a groove depth smaller.

3. The heavy-duty pneumatic tire according to claim 2, wherein a depth D2 of the raised bottom portion and a tread width T in the tire width direction of a tread portion having the tread pattern formed thereon satisfy a relationship of D2/T <0.05.

4. The heavy-duty pneumatic tire according to claim 1, wherein the circumferential secondary groove comprises at least two groove turning portions changing an extending direction of the groove in a region between adjacent center lug grooves in the tire circumferential direction.

5. The heavy-duty pneumatic tire according to claim 1, wherein orientations of reinforcing cords of belts having greater widths in the belt pairs of the belt layers are inclined toward a same side in the tire width direction with respect to the tire circumferential direction.

6. The heavy-duty pneumatic tire according to claim 1, wherein pairs of adjacent belts in the belt portion each form cross layers by inclining reinforcing cords of the belts toward opposite sides in the tire width direction with respect to the tire circumferential direction.

7. The heavy-duty pneumatic tire according to claim 1, wherein a belt positioned closer to the outside in the tire radial direction has a greater width among the belts having greater widths in the belt pairs of the belt layers.

8. The heavy-duty pneumatic tire according to claim 1, wherein the belt portion comprises a first belt pair positioned innermost in the tire radial direction, a second belt pair laminated outside the first belt pair in the tire radial direction, and a third belt pair laminated outside the second belt pair in the tire radial direction;

a ratio WB/W3 of the maximum width WB of the center blocks in the tire width direction to a width W3 of a belt having a smaller width in the third belt pair is 0.5 or greater and 0.8 or less; and the width W3 is greater than a width W2 of a belt having a smaller width in the second belt pair.

9. The heavy-duty pneumatic tire according to claim 1, wherein the belt portion comprises a first belt pair positioned innermost in the tire radial direction, a second belt pair laminated outside the first belt pair in the tire radial direction, and a third belt pair laminated outside the second belt pair in the tire radial direction; and a width W1 of a belt having a smaller width in the first belt pair is smaller than the maximum width WB of the center blocks in the tire width direction.

10. The heavy-duty pneumatic tire according to claim 1, wherein the center blocks are provided with corners in correspondence with the circumferential primary grooves, the corners having obtuse angles.

11. The heavy-duty pneumatic tire according to claim 1, wherein widths of the circumferential primary grooves and the center lug grooves are 7 mm or greater and 20 mm or less.

12. The heavy-duty pneumatic tire according to claim 1 being fitted to a construction or industrial vehicle.

13. The heavy-duty pneumatic tire according to claim 1, wherein the circumferential secondary groove extends from a single position of each of the center lug grooves in the tire circumferential direction, on opposites sides of each of the center lug grooves.

14. A heavy-duty pneumatic tire comprising a tread pattern and a belt portion, the tread pattern comprising:

a plurality of center lug grooves separated from each other in a tire circumferential direction, the center lug grooves extending in half-tread regions on a first side and a second side of a tire equator line in a tire width direction so as to cross the tire equator line, and the center lug grooves including both ends;

shoulder lug grooves positioned, in the tire circumferential direction, between adjacent center lug grooves in the tire circumferential direction among the center lug grooves, the shoulder lug grooves extending outward in the tire width direction in the half-tread regions, and the shoulder lug grooves having ends on an outside in the tire width direction opening at ground contact ends on both sides in the tire width direction and ends on an inside in the tire width direction being positioned outward in the tire width direction with respect to ends of the center lug grooves;

a pair of circumferential primary grooves formed in wave-like shapes in the respective half-tread regions over an entire periphery of the tire by alternately connecting the ends of the center lug grooves and the ends of the shoulder lug grooves on the inside in the tire width direction, the circumferential primary grooves having a smaller width than a width of the shoulder lug grooves;

a plurality of center blocks defined by the center lug grooves and the pair of circumferential primary grooves and aligned in a row in the tire circumferential direction; and a circumferential secondary groove extending along the tire equator line in the tire circumferential direction so as to divide regions of the center blocks, the circumferential secondary groove extending from a single position of each of the center lug grooves in the tire circumferential direction, on opposites sides of each of the center lug grooves;

the belt portion comprising at least a first belt disposed on an innermost side in a tire radial direction, a second belt having a different width from the first belt, a third belt, and a fourth belt having a different width from the third belt in order from the first belt toward an outside in the tire radial direction, the belt portion having a laminated structure of belt layers composed of at least two belt pairs, the two belt pairs being a pair of the first belt and the second belt and a pair of the third belt and the fourth belt;

the belt pairs of the belt layers each having a ratio W8/W7 of 0.75 or greater and 0.90 or less, the ratio indicating a width W8 of a belt having a smaller width in the belt layer to a width W7 of a belt having a greater width in the belt layer; and fourth and subsequent belts from an innermost belt in the tire radial direction toward the outside in the tire radial direction in the laminated structure of the belt portion each having a width equal to or greater than a maximum width WB of the center blocks in the tire width direction; wherein the center lug grooves each comprise a first groove turning portion bent or curved so as to protrude toward a third side in the tire circumferential direction on the first side and a second groove turning portion bent or curved so as to protrude toward a fourth side opposite to the third side in the tire circumferential direction on the second side;

the center lug grooves each connect with the circumferential primary grooves at a first connection end on the first side and at a second connection end on the second side, the first connection end and the second connection end connecting with tips of the circumferential primary grooves on the inside in the tire width direction, and the second connection end of each of the center lug grooves being positioned on the third side in the tire circumferential direction with respect to the first connection end; and concerning a central position of each of center lug grooves in a groove width direction, an inclination angle of a first straight line connecting the first connection end with a protruding end, protruding toward the third side in the tire circumferential direction, of the first groove turning portion with respect to the tire width direction and an inclination angle of a second straight line connecting the second connection end with a protruding end, protruding toward the fourth side in the tire circumferential direction, of the second groove turning portion with respect to the tire width direction are greater than an inclination angle of a third straight line connecting the first connection end with the second connection end of the center lug groove with respect to the tire width direction.

15. The heavy-duty pneumatic tire according to claim 14, wherein concerning the central position of the center lug groove in the groove width direction, a section of each of the center lug groove between the protruding end, protruding toward the third side in the tire circumferential direction, of the first groove turning portion and the first connection end is on the first straight line or on the third side with respect to the first straight line, and a section of the center lug groove between the protruding end, protruding toward the fourth side in the tire circumferential direction, of the second groove turning portion and the second connection end is on the second straight line or on the fourth side with respect to the second straight line.

16. The heavy-duty pneumatic tire according to claim 14, wherein the circumferential secondary groove is shallower than the circumferential primary grooves; the circumferential secondary groove is formed over the entire periphery of the tire along the tire equator line; and the circumferential secondary groove crosses the center lug grooves so as to penetrate each of the center lug grooves in regions between and inclusive of the first groove turning portion and the second groove turning portion in the tire width direction.

17. The heavy-duty pneumatic tire according to claim 16, wherein the circumferential secondary groove comprises fifth groove turning portions and sixth groove turning portions on an periphery of the tire, the fifth groove turning portions being curved or bent so as to change directions thereof clockwise and the sixth groove turning portions being curved or bent so as to change directions thereof counterclockwise upon viewing the tread pattern from the outside toward the inside in the tire radial direction in traveling toward the third side in the tire circumferential direction; and sections of the circumferential secondary grooves between adjacent center lug grooves among the center lug grooves each being provided with one of the fifth groove turning portions and one of the sixth groove turning portions.

18. The heavy-duty pneumatic tire according to claim 17, wherein the circumferential secondary groove comprises, on the periphery of the tire, a plurality of sets of one of the fifth groove turning portions, another of the fifth groove turning portions, one of the sixth groove turning portions, and another of the sixth groove turning portions arranged successively in the tire circumferential direction; and a section between the one fifth groove turning portion and the other fifth groove turning portion and a section between the one sixth groove turning portion and the other sixth groove turning portion, of the circumferential secondary groove are straight grooves extending parallel to the tire equator line.

19. A heavy-duty pneumatic tire comprising a tread pattern and a belt portion, the tread pattern comprising:

a plurality of center lug grooves separated from each other in a tire circumferential direction, the center lug grooves extending in half-tread regions on a first side and a second side of a tire equator line in a tire width direction so as to cross the tire equator line, and the center lug grooves including both ends;

shoulder lug grooves positioned, in the tire circumferential direction, between adjacent center lug grooves in the tire circumferential direction among the center lug grooves, the shoulder lug grooves extending outward in the tire width direction in the half-tread regions, and the shoulder lug grooves having ends on an outside in the tire width direction opening at ground contact ends on both sides in the tire width direction and ends on an inside in the tire width direction being positioned outward in the tire width direction with respect to ends of the center lug grooves;

a pair of circumferential primary grooves formed in wave-like shapes in the respective half-tread regions over an entire periphery of the tire by alternately connecting the ends of the center lug grooves and the ends of the shoulder lug grooves on the inside in the tire width direction, the circumferential primary grooves having a smaller width than a width of the shoulder lug grooves;

a plurality of center blocks defined by the center lug grooves and the pair of circumferential primary grooves and aligned in a row in the tire circumferential direction; and a circumferential secondary groove extending along the tire equator line in the tire circumferential direction so as to divide regions of the center blocks;

the belt portion comprising at least a first belt disposed on an innermost side in a tire radial direction, a second belt having a different width from the first belt, a third belt, and a fourth belt having a different width from the third belt in order from the first belt toward an outside in the tire radial direction, the belt portion having a laminated structure of belt layers composed of at least two belt pairs, the two belt pairs being a pair of the first belt and the second belt and a pair of the third belt and the fourth belt;

the belt pairs of the belt layers each having a ratio W8/W7 of 0.75 or greater and 0.90 or less, the ratio indicating a width W8 of a belt having a smaller width in the belt layer to a width W7 of a belt having a greater width in the belt layer; and fourth and subsequent belts from an innermost belt in the tire radial direction toward the outside in the tire radial direction in the laminated structure of the belt portion each having a width equal to or greater than a maximum width WB of the center blocks in the tire width direction; wherein the center lug grooves each comprise a first groove turning portion bent or curved so as to protrude toward a third side in the tire circumferential direction on the first side and a second groove turning portion bent or curved so as to protrude toward a fourth side opposite to the third side in the tire circumferential direction on the second side;

the center lug grooves each connect with the circumferential primary grooves at a first connection end on the first side and at a second connection end on the second side, the first connection end and the second connection end connecting with tips of the circumferential primary grooves on the inside in the tire width direction, and the second connection end of each of the center lug grooves being positioned on the third side in the tire circumferential direction with respect to the first connection end; and concerning a central position of each of center lug grooves in a groove width direction, an inclination angle of a first straight line connecting the first connection end with a protruding end, protruding toward the third side in the tire circumferential direction, of the first groove turning portion with respect to the tire width direction and an inclination angle of a second straight line connecting the second connection end with a protruding end, protruding toward the fourth side in the tire circumferential direction, of the second groove turning portion with respect to the tire width direction are greater than an inclination angle of a third straight line connecting the first connection end with the second connection end of the center lug groove with respect to the tire width direction;

the circumferential secondary groove is shallower than the circumferential primary grooves;

the circumferential secondary groove is formed over the entire periphery of the tire along the tire equator line;

the circumferential secondary groove crosses the center lug grooves so as to penetrate each of the center lug grooves in regions between and inclusive of the first groove turning portion and the second groove turning portion in the tire width direction;

the circumferential secondary groove comprises fifth groove turning portions and sixth groove turning portions on an periphery of the tire, the fifth groove turning portions being curved or bent so as to change directions thereof clockwise and the sixth groove turning portions being curved or bent so as to change directions thereof counterclockwise upon viewing the tread pattern from the outside toward the inside in the tire radial direction in traveling toward the third side in the tire circumferential direction;

sections of the circumferential secondary grooves between adjacent center lug grooves among the center lug grooves each being provided with one of the fifth groove turning portions and one of the sixth groove turning portions; and the circumferential secondary groove comprises pairs of two successive fifth groove turning portions and pairs of two successive sixth groove turning portions in the tire circumferential direction; and the center lug grooves cross between each of the pairs of two successive fifth groove turning portions and between each of the pairs of two successive sixth groove turning portions.

20. A heavy-duty pneumatic tire comprising a tread pattern and a belt portion, the tread pattern comprising:

a plurality of center lug grooves separated from each other in a tire circumferential direction, the center lug grooves extending in half-tread regions on a first side and a second side of a tire equator line in a tire width direction so as to cross the tire equator line, and the center lug grooves including both ends;

shoulder lug grooves positioned, in the tire circumferential direction, between adjacent center lug grooves in the tire circumferential direction among the center lug grooves, the shoulder lug grooves extending outward in the tire width direction in the half-tread regions, and the shoulder lug grooves having ends on an outside in the tire width direction opening at ground contact ends on both sides in the tire width direction and ends on an inside in the tire width direction being positioned outward in the tire width direction with respect to ends of the center lug grooves;

a pair of circumferential primary grooves formed in wave-like shapes in the respective half-tread regions over an entire periphery of the tire by alternately connecting the ends of the center lug grooves and the ends of the shoulder lug grooves on the inside in the tire width direction, the circumferential primary grooves having a smaller width than a width of the shoulder lug grooves;

a plurality of center blocks defined by the center lug grooves and the pair of circumferential primary grooves and aligned in a row in the tire circumferential direction; and a circumferential secondary groove extending, in the tire circumferential direction, from a first single position of each of the center lug grooves to each of two second positions of adjacent center lug grooves adjacent to each of the center lug grooves on opposites sides of each of the center lug grooves in the tire circumferential direction so as to divide each of regions of the center blocks, the single position and the two second positions being on opposite sides of the tire equator line from each other;

the belt portion comprising at least a first belt disposed on an innermost side in a tire radial direction, a second belt having a different width from the first belt, a third belt, and a fourth belt having a different width from the third belt in order from the first belt toward an outside in the tire radial direction, the belt portion having a laminated structure of belt layers composed of at least two belt pairs, the two belt pairs being a pair of the first belt and the second belt and a pair of the third belt and the fourth belt;

the belt pairs of the belt layers each having a ratio W8/W7 of 0.75 or greater and 0.90 or less, the ratio indicating a width W8 of a belt having a smaller width in the belt layer to a width W7 of a belt having a greater width in the belt layer; and fourth and subsequent belts from an innermost belt in the tire radial direction toward the outside in the tire radial direction in the laminated structure of the belt portion each having a width equal to or greater than a maximum width WB of the center blocks in the tire width direction.

\* \* \* \* \*